(12) United States Patent
Webb

(10) Patent No.: US 10,752,393 B2
(45) Date of Patent: Aug. 25, 2020

(54) HUMAN TISSUE ISOLATION POUCH FOR USE WITH POUCH SEALER

(71) Applicant: Charles Webb, Solvang, CA (US)

(72) Inventor: Charles Webb, Solvang, CA (US)

(*) Notice: Subject to any disclaimer, the term of this patent is extended or adjusted under 35 U.S.C. 154(b) by 196 days.

(21) Appl. No.: 15/713,240

(22) Filed: Sep. 22, 2017

(65) Prior Publication Data

US 2019/0092506 A1 Mar. 28, 2019

(51) Int. Cl.
| | |
|---|---|
| *G01M 3/34* | (2006.01) |
| *B65B 51/10* | (2006.01) |
| *A01N 1/00* | (2006.01) |
| *B29C 65/00* | (2006.01) |
| *B29C 65/18* | (2006.01) |
| *B29L 31/00* | (2006.01) |
| *B29K 79/00* | (2006.01) |
| *B29C 65/38* | (2006.01) |
| *B65B 51/14* | (2006.01) |

(52) U.S. Cl.
CPC ............ *B65B 51/10* (2013.01); *A01N 1/00* (2013.01); *B29C 65/18* (2013.01); *B29C 66/0044* (2013.01); *B29C 66/1122* (2013.01); *B29C 66/43121* (2013.01); *B29C 66/71* (2013.01); *B29C 66/7373* (2013.01); *B29C 66/73921* (2013.01); *B29C 66/81261* (2013.01); *B29C 66/8322* (2013.01); *B29C 66/849* (2013.01); *B29C 66/87* (2013.01); *B29C 65/38* (2013.01); *B29C 66/8122* (2013.01); *B29K 2079/08* (2013.01); *B29L 2031/712* (2013.01); *B29L 2031/7148* (2013.01); *B65B 51/146* (2013.01)

(58) Field of Classification Search
CPC ......... C12M 45/22; B65B 51/10; G01M 3/34; G01M 3/103; G01M 3/147
USPC .............................................. 383/11
See application file for complete search history.

(56) References Cited

U.S. PATENT DOCUMENTS 4,642,934 A * 2/1987 Carlson .................. A01K 97/20
220/495.03
5,253,754 A * 10/1993 Soodak .................... A01N 1/02
206/438

(Continued)

*Primary Examiner* — Derek J Battisti
(74) *Attorney, Agent, or Firm* — Michael J. Foycik, Jr.

(57) ABSTRACT

A human tissue isolation pouch for use with a sealer machine to indirectly seal human tissue medical pouches while avoiding cross contamination is herein disclosed. The human tissue isolation pouch comprises a rigid frame supporting a high temperature material and having one or more magnets for removably attaching the human tissue isolation pouch to a sealer machine.

During use a medical pouch, which may contain a human tissue sample, is inserted within the human tissue isolation pouch. The jaws of the sealer machine clamp down directly on the high temperature material, thus indirectly heating and sealing the medical pouch inside the human tissue isolation pouch. The sealing machine jaws do not physically contact the medical pouch at any time during the sealing process, and in this way contamination of the sealer machine (and cross contamination of medical pouches from distinct donor cases) is avoided. The rigid frame of the human tissue isolation pouch may be sterilized after each donor event. And the containment bag formed of a high temperature material may be disposed of after each donor event.

18 Claims, 2 Drawing Sheets

(56) References Cited

U.S. PATENT DOCUMENTS

| | | | | |
|---|---|---|---|---|
| 6,116,412 | A * | 9/2000 | Rogers | A45C 11/04 |
| | | | | 206/5 |
| 6,505,967 | B1 * | 1/2003 | Alfero-Kuronya | B08B 15/04 |
| | | | | 383/11 |
| 6,609,258 | B1 * | 8/2003 | Clements | B08B 3/006 |
| | | | | 206/576 |
| 2007/0080092 | A1 * | 4/2007 | DeLuca | B65D 31/10 |
| | | | | 206/554 |
| 2007/0147712 | A1 * | 6/2007 | Ozdeger Donovan | B42F 7/06 |
| | | | | 383/22 |
| 2011/0052106 | A1 * | 3/2011 | Holmes | B65D 31/02 |
| | | | | 383/119 |

* cited by examiner

HUMAN TISSUE ISOLATION POUCH FOR USE WITH POUCH SEALER

BRIEF DESCRIPTION OF THE INVENTION

The present invention relates to a device for avoiding packaging machine contamination when processing and packaging human tissue, and more particularly, to an isolation pouch for avoiding cross contamination by isolating the human tissue from the sealer packaging machine components during the sealing operation. The herein disclosed containment pouch is formed of a high temperature material, such as Kapton (a registered trademark of the DuPont corporation), allowing for indirect sealing of the human tissue by a sealer machine through the high temperature material.

The human tissue isolation pouch for use with a sealer machine comprises a rigid frame supporting a high temperature material and having one or more magnets for removably attaching the human tissue isolation pouch to a sealer machine. During use, the human tissue isolation pouch may be attached, via one or more magnets, onto a tray of a sealer machine. A medical pouch, which may contain a human tissue sample, may be inserted within the human tissue isolation pouch. The jaws of the sealer machine clamp down directly on the high temperature material, thus indirectly heating and sealing the medical pouch inside the human tissue isolation pouch. The sealing machine jaws do not physically contact the medical pouch at any time during the sealing process, and in this way contamination of the sealer machine (and cross contamination of medical pouches from distinct donor cases) is avoided. The rigid frame of the human tissue isolation pouch may be sterilized after each donor event. And the containment bag formed of a high temperature material may be disposed of after each donor event.

CROSS-REFERENCES TO RELATED APPLICATIONS

Not applicable.

STATEMENTS AS TO THE RIGHTS TO INVENTIONS MADE UNDER FEDERALLY SPONSORED RESEARCH OR DEVELOPMENT

Not applicable.

REFERENCE TO A "SEQUENCE LISTING," A TABLE, OR A COMPUTER PROGRAM LISTING APPENDIX SUBMITTED ON A COMPACT DISK

Not applicable.

BACKGROUND OF THE INVENTION

The present invention relates to a device for avoiding packaging machine contamination when processing and packaging human tissue, and more particularly, to an isolation pouch for avoiding cross contamination by isolating the human tissue from the sealer packaging machine components during the sealing operation.

The basics of medical sealer devices are well known. Generally, medical sealers (as these devices are known) require four basic components: a solenoid or pneumatic piston for applying pressure, a jaw mechanism for holding the medical package, a heating element for melting the package material, and a processor for controlling the mechanical components and for communicating with other devices (or with the internet). Medical sealer devices operate by the solenoid or pneumatic piston engaging the jaw mechanism to pull an upper jaw down onto a lower jaw in order to apply a predetermined pressure to a flexible medical package (a medical package may also be referred to as a pouch). The heating element is then flash heated to a predetermined temperature (a temperature required to melt the packaging material) for a predetermined time to melt the packaging material; wherein the processor may determine the predetermined temperature and the predetermined time. The jaw mechanism is held closed for a predetermined cool time (also determined by the processor), after which the package may be safely removed from the medical sealer device.

When using a sealer machine to seal medical pouches containing human tissue, cross contamination between samples or between donors is a major problem that must be avoided. Currently utilized procedures for avoiding contamination involve aggressively wiping down sealer machine components with antimicrobial disinfectants and the like. But such wipe-down procedures can damage vital sealer machine components and therefore decrease the life cycle of an expensive and necessary piece of equipment.

There is a need, therefore, for alternative means to avoid cross contamination during processing of human tissue samples. The herein disclosed human tissue isolation pouch avoids cross contamination in an entirely new way. By allowing for indirect heating/sealing of the medical pouch through the isolation pouch, the human tissue remains isolated from the sealer jaws at all times during the sealing operation. The sealer jaws are not exposed to the human tissue, and thus the sealer jaws cannot contaminate subsequent human tissue samples and do not need to be wiped down with damaging antimicrobials.

DETAILED DESCRIPTION OF THE INVENTION

The present invention relates to a device for avoiding packaging machine contamination when processing and packaging human tissue, and more particularly, to an isolation pouch for avoiding cross contamination by isolating the human tissue from the sealer packaging machine components during the sealing operation. The present invention may be referred to as a human tissue isolation pouch, or alternatively, as a device for avoiding cross contamination during processing of human tissue or as a device for indirectly heat sealing a human tissue medical pouch with a sealer machine.

The phrase "human tissue" is used throughout this specification and claims and is intended to include human tissue, human tissue samples, human organs, human test specimens (such as Biopsies), contaminated medical instruments, and any other active biology that will be aseptically processed and thus may contaminate packaging equipment (such as a sealer machine) and potentially cause a cross contamination event resulting in human infection. All such subjects or items are intended to be included in the term "human tissue".

Figure 1:
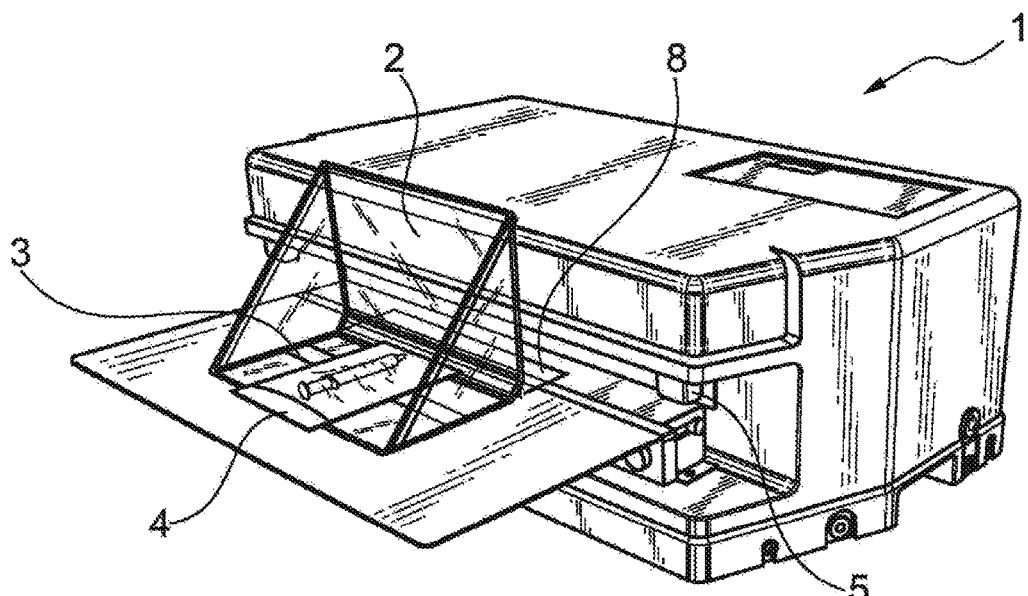
FIG. 1 illustrates a general overview of a human tissue isolation pouch as attached to a standard sealer machine during use, in accordance with the present invention.

Referring to FIG. 1, human tissue isolation pouch 2 is removably attached to standard sealer machine 1 by one or more magnets 3. Sealer machine 1 may be any sealer machine having one or more sealing jaw 5 for sealing a medical pouch (sealer machine 1 forms no part of the herein disclosed invention, and is provided to demonstrate the herein disclosed invention in use with such a sealer machine). As seen in FIG. 1, human tissue isolation pouch 2 removably attaches to a tray of sealer machine 1, so that human tissue isolation pouch 2 is positioned in front of sealing jaw 5. During use, human tissue medical pouch 4 may be placed within human tissue isolation pouch 2.

An exemplary embodiment of herein disclosed human tissue isolation pouch 2 comprises a rigid frame forming a three-dimensional isolation pouch shape; one or more magnets for removably attaching the rigid frame to a sealer machine; and a high temperature material spanning the rigid frame to form an isolation pouch, wherein the isolation pouch includes a sealing envelope that receives a human tissue medical pouch and wherein the isolation pouch receives heat from the sealer machine and transfers heat to the human tissue medical pouch to seal the human tissue medical pouch.

Figure 2:
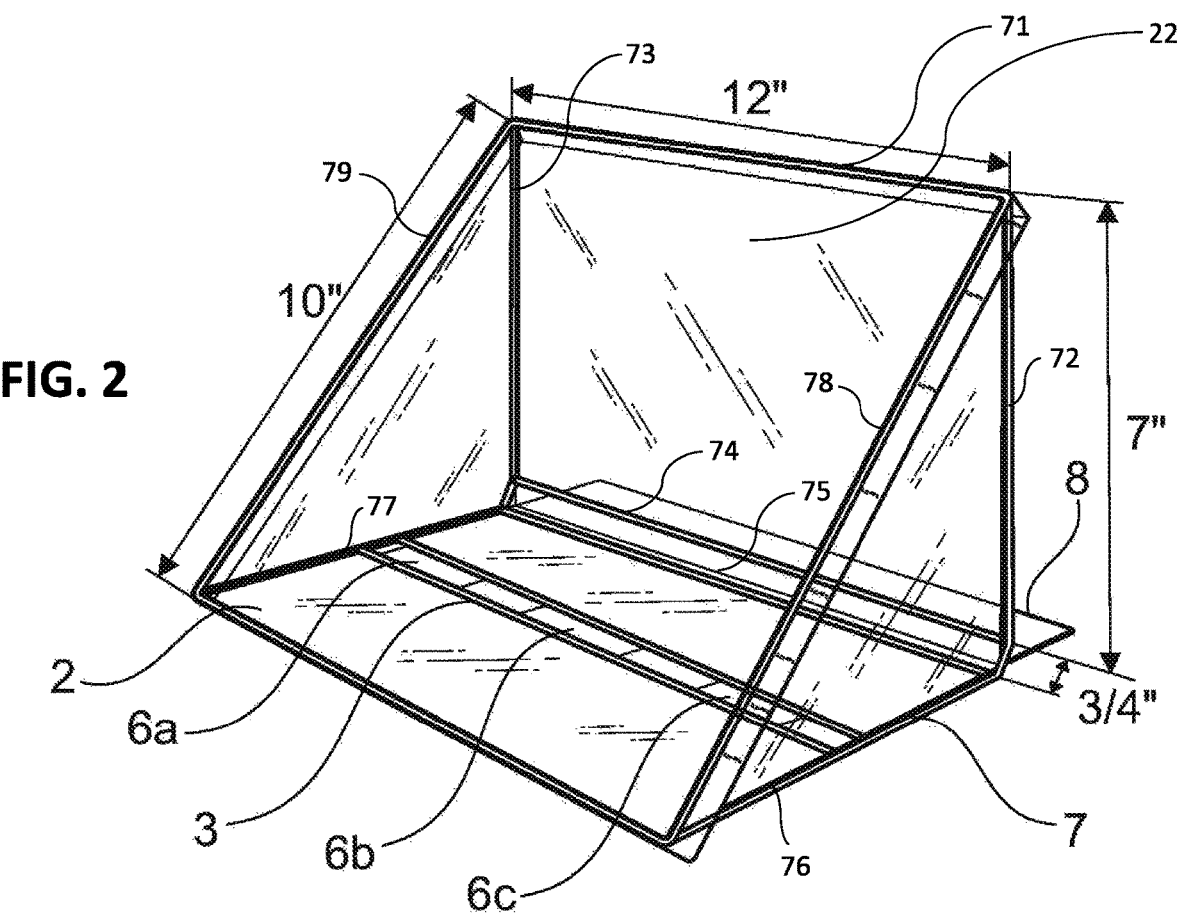
FIG. 2 illustrates an isometric view of an exemplary embodiment of a human tissue isolation pouch for use with a pouch sealer, in accordance with the present invention.

Referring to FIG. 2, an exemplary embodiment of herein disclosed human tissue isolation pouch 2 is illustrated in detail. Rigid frame 7 may be formed of any rigid and sterile material known in the art, such as stainless steel for example. Rigid frame 7 forms a three-dimensional isolation pouch shape, which may be any shape having a sufficient volume to receive a human tissue medical pouch. In a preferred embodiment, rigid frame 7 forms a triangular prism shape, as is illustrated in FIG. 2.

Rigid frame 7 may be formed of a plurality of members. For example, rigid frame 7 may include horizontal top member 71 (which may be 12 inches in length), first vertical side member 72 (which may be 7 inches in height) protruding downward from horizontal top member 71, second vertical side member 73 (which may be 7 inches in height) in parallel with first vertical side member 72, envelope top member 74 defining an upper surface of the sealing envelope 8, envelope bottom member 75 in parallel with envelope top member 74 and defining a lower surface of sealing envelope 8, a first horizontal side member 76 protruding from envelope bottom member 75, second horizontal side member 77 in parallel with first horizontal side member 76 and protruding from envelope bottom member 75, a first angled member 78 spanning from horizontal top member 71 to first horizontal side member 76 (which may be 10 inches in length), and second angled member spanning from horizontal top member 71 to second horizontal side member 77. Envelope top member 74 may be positioned approximately 0.75 inches from envelope bottom member 75, at an angle so that envelope top member 74 may be directly below horizontal top member 71 while envelope bottom member 75 is somewhat offset from horizontal member 71.

All dimensions shown in FIG. 2 are intended to be exemplary and are included to illustrate a preferred embodiment of the present invention. But it will be apparent to those skilled in the art that alternative dimensions for the present invention may adequately address the issue of providing a rigid frame for forming a three-dimensional isolation pouch shape, and all such alternative dimensions for the present invention are intended to be included herein.

As illustrated in FIG. 2, the herein disclosed human tissue isolation pouch includes one or more magnets 3 for removably attaching rigid frame 7 to standard sealer machine 1. One or more magnets 3 may be any type of magnet capable of removably attaching human tissue isolation pouch 2 to a standard sealer machine. One or more magnets 3 may be rare earth magnets such as Neodymium magnets, for example. In an exemplary embodiment, the one or more magnets 2 may include a first magnet 6a, a second magnet 6b, and a third magnet 6c.

Human tissue isolation pouch further includes a high temperature material 22 spanning the rigid frame to form an isolation pouch. High temperature material 22 may be any material known in the art that has a melting temperature substantially higher than that of the human tissue medical pouch to be sealed, so that when heat is transferred through high temperature material 22 to the human tissue medical pouch within, the high temperature material does not substantially melt or permanently deform. In an exemplary embodiment, high temperature material 22 may withstand temperatures up to at least 400 degrees Fahrenheit.

In a preferred embodiment of the present invention, a material known as Kapton (a registered trademark of the DuPont corporation) may be used as high temperature material 22. This material may alternatively be known as Kapton FN. Those skilled in the art will recognize that other materials may provide the required characteristics to advantageously form an isolation pouch, and all such materials are intended to be included herein.

Figure 3:
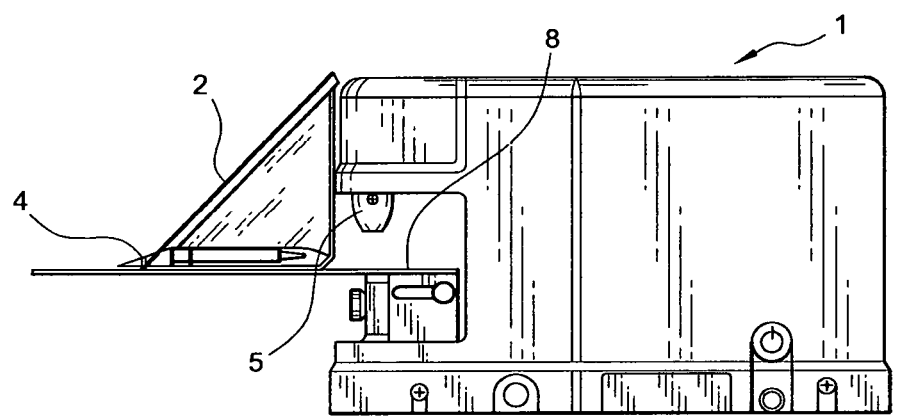
FIG. 3 illustrates a side view of an exemplary embodiment of a human tissue isolation pouch as attached to a standard sealer machine, in accordance with the present invention.

Referring to FIG. 3, a side view of an exemplary embodiment of the herein disclosed human tissue isolation pouch as attached to a standard sealer machine is illustrated. As seen in FIG. 3, human tissue medical pouch 4 is placed within human tissue isolation pouch 2, which is attached to sealer machine 1. Sealing envelope 8 is placed within (or underneath) sealing jaw 5.

Figure 4:
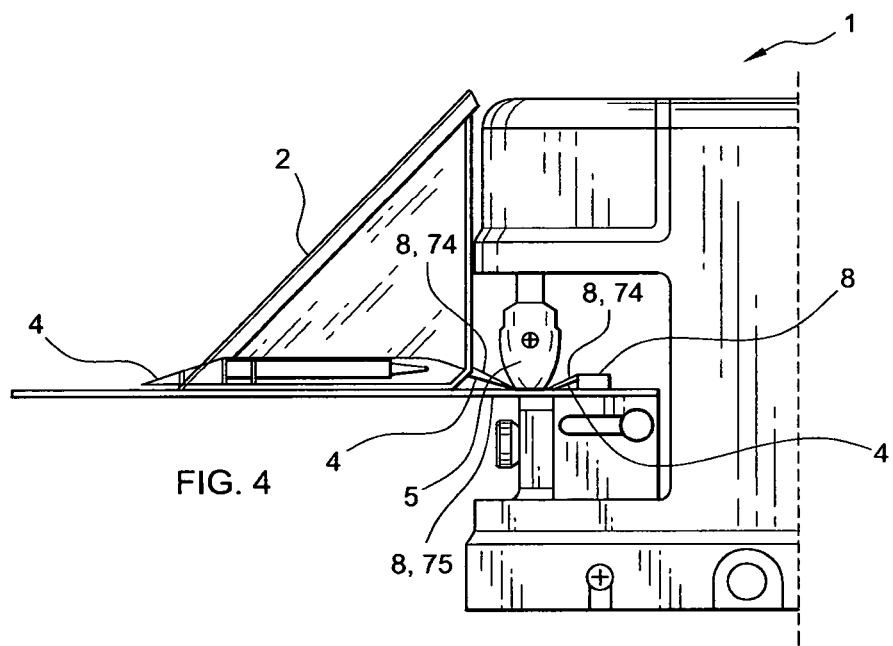
FIG. 4 illustrates a close-up side view of an exemplary embodiment of a human tissue isolation pouch as attached to a standard sealer machine, wherein the sealer machine is shown with the sealing jaws closed during a sealing operation to indirectly heat and seal the medical pouch within the human tissue isolation pouch, in accordance with the present invention.

Referring to FIG. 4, the present invention is illustrated in use during a sealing operation. Sealing jaw 5 is closed onto sealing envelope 8. As can be seen in FIG. 4, a portion of human tissue medical pouch 4 protrudes into sealing envelope 8 so that when heat and/or pressure are applied by sealing jaw 5 onto sealing envelope 8, the heat and/or pressure are transferred through the high temperature material forming sealing envelope 8 to the material forming human tissue medical pouch 4. Thus, the material forming human tissue medical pouch 4 is sealed through indirect heating (or sealing) by sealer machine 1.

As seen in FIG. 4, sealer jaw 5 does not directly contact human tissue medical pouch 4 during the sealing operation. In this way, the sealing operation and the sealing machine itself remain can avoid contamination by the human tissue.

The present invention has been described in terms of a device for indirectly heat sealing a human tissue medical pouch with a sealer machine. But the present invention may also be described as methods for indirectly heat sealing a human tissue medical pouch with a sealer machine. The methods associated with the present invention include the steps of: attaching a human tissue isolation pouch to a tray of a sealer machine, wherein the human tissue isolation pouch includes a sealing envelope formed of a high temperature material; inserting an unsealed human tissue medical pouch into the sealing envelope; operating the sealing machine to apply heat to the sealing envelope of the human tissue isolation pouch; transferring heat through the high temperature material to the unsealed human tissue medical pouch; sealing the unsealed human tissue medical pouch to form a sealed human tissue medical pouch; and removing the sealed human tissue medical pouch from the human tissue isolation pouch. The herein disclosed methods may further include the steps of: disposing of the human tissue isolation pouch; and, sterilizing the rigid frame.

While the present invention has been illustrated and described herein in terms of a preferred embodiment and several alternatives, it is to be understood that the devices and methods described herein can have a multitude of additional uses and applications. Accordingly, the invention should not be limited to just the particular description and various drawing figures contained in this specification that merely illustrate a preferred embodiment and application of the principles of the invention.

What is claimed is:

1. A device for use with a sealing machine which has a sealing jaw and a tray in front of the sealing jaw, for avoiding cross contamination between a human tissue medical pouch and the sealing machine during processing of human tissue, comprising:
   a rigid frame forming part of a human tissue isolation pouch, said rigid frame forming a three-dimensional isolation pouch shape;
   one or more magnets for removably attaching the rigid frame to a tray of a sealer machine; and
   a high temperature material spanning the rigid frame to form an isolation pouch, said high temperature material also forming a sealing envelope that receives a human tissue medical pouch without allowing contact between the human tissue medical pouch and the sealing machine, and wherein the sealing envelope of the isolation pouch has an envelope top member and an envelope bottom member; the human tissue medical pouch being received between the envelope top member and the envelope bottom member; and wherein the sealing envelope receives heat from the sealer machine and transfers heat to the human tissue medical pouch to seal an end portion of the human tissue medical pouch.

2. The device for avoiding cross contamination during processing of human tissue as recited in claim 1, wherein the high temperature material can withstand temperatures up to at least 400 degrees Fahrenheit without deformation.

3. The device for avoiding cross contamination during processing of human tissue as recited in claim 1, wherein the high temperature material has a melting temperature substantially higher than that of the human tissue medical pouch.

4. The device for avoiding cross contamination during processing of human tissue as recited in claim 1, wherein the high temperature material is Kapton.

5. The device for avoiding cross contamination during processing of human tissue as recited in claim 1, wherein the rigid frame is formed of stainless steel.

6. The device for avoiding cross contamination during processing of human tissue as recited in claim 1, wherein the isolation pouch shape is a triangular prism.

7. The device for avoiding cross contamination during processing of human tissue as recited in claim 1, wherein the rigid frame includes a horizontal top member, a first vertical side member protruding downward from the horizontal top member, a second vertical side member in parallel with the first vertical side member, an envelope top member defining an upper surface of the sealing envelope, an envelope bottom member in parallel with the envelope top member and defining a lower surface of the sealing envelope, a first horizontal side member protruding from the envelope bottom member, a second horizontal side member in parallel with the first horizontal side member and protruding from the envelope bottom member, a first angled member spanning from the horizontal top member to the first horizontal side member, and a second angled member spanning from the horizontal top member to the second horizontal side member.

8. The device for avoiding cross contamination during processing of human tissue as recited in claim 7, wherein the horizontal top member is 12 inches in length, the first vertical side member and the second vertical side member are both 7 inches in height, the first angled member and the second angled member are both 10 inches in length, and the envelope bottom member is separated from the envelope top member by 0.75 inches.

9. The device for avoiding cross contamination during processing of human tissue as recited in claim 1, wherein the one or more magnets are rare earth magnets and include a first magnet, a second magnet, and a third magnet.

10. The device for avoiding cross contamination during processing of human tissue as recited in claim 1, wherein the one or more magnets are neodymium.

11. A device for indirectly heat sealing a human tissue medical pouch with a sealer machine, the sealing machine which has a sealing jaw and a tray in front of the sealing jaw, comprising:
   a rigid frame forming a three-dimensional isolation pouch shape;
   one or more magnets for removably attaching the rigid frame to a sealer machine; and
   a high temperature material spanning the rigid frame to form an isolation pouch for isolating the human tissue medical pouch from the sealer machine during a sealing operation;
   said high temperature material also forming a sealing envelope that receives a human tissue medical pouch without allowing contact between the human tissue medical pouch and the sealing machine, and wherein the sealing envelope of the isolation pouch has an envelope top member and an envelope bottom member; the human tissue medical pouch being received between the envelope top member and the envelope bottom member.

12. The device for indirectly heat sealing a human tissue medical pouch with a sealer machine as recited in claim 11, wherein the sealing envelope transfers heat from the sealer machine to the human tissue medical pouch to seal an end of the human tissue medical pouch.

13. The device for indirectly heat sealing a human tissue medical pouch with a sealer machine as recited in claim 11, wherein the high temperature material can withstand temperatures up to at least 400 degrees Fahrenheit without deformation.

14. The device for indirectly heat sealing a human tissue medical pouch with a sealer machine as recited in claim 11, wherein the high temperature material has a melting temperature substantially higher than that of the human tissue medical pouch.

15. The device for indirectly heat sealing a human tissue medical pouch with a sealer machine as recited in claim 11, wherein the high temperature material is Kapton.

16. The device for indirectly heat sealing a human tissue medical pouch with a sealer machine as recited in claim 11, wherein the isolation pouch shape is a triangular prism.

17. The device for indirectly heat sealing a human tissue medical pouch with a sealer machine as recited in claim 16, wherein the rigid frame includes a horizontal top member, a first vertical side member protruding downward from the horizontal top member, a second vertical side member in parallel with the first vertical side member, an envelope top member defining an upper surface of the sealing envelope, an envelope bottom member in parallel with the envelope top member and defining a lower surface of the sealing envelope, a first horizontal side member protruding from the envelope bottom member, a second horizontal side member in parallel with the first horizontal side member and protruding from the envelope bottom member, a first angled member spanning from the horizontal top member to the first horizontal side member, and a second angled member spanning from the horizontal top member to the second horizontal side member.

18. The device for indirectly heat sealing a human tissue medical pouch with a sealer machine as recited in claim 17, wherein the horizontal top member is 12 inches in length, the first vertical side member and the second vertical side member are both 7 inches in height, the first angled member and the second angled member are both 10 inches in length, and the envelope bottom member is separated from the envelope top member by 0.75 inches.

* * * * *